United States Patent
Choi et al.

(10) Patent No.: US 12,456,726 B2
(45) Date of Patent: Oct. 28, 2025

(54) NEGATIVE ELECTRODE ACTIVE MATERIAL, AND NEGATIVE ELECTRODE AND SECONDARY BATTERY INCLUDING THE SAME

(71) Applicant: LG ENERGY SOLUTION, LTD., Seoul (KR)

(72) Inventors: Jung Hyun Choi, Daejeon (KR); Hang Ah Park, Daejeon (KR); Sun Young Shin, Daejeon (KR); Je Young Kim, Daejeon (KR); Yong Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 636 days.

(21) Appl. No.: 17/790,620

(22) PCT Filed: Jan. 27, 2021

(86) PCT No.: PCT/KR2021/001085
§ 371 (c)(1),
(2) Date: Jul. 1, 2022

(87) PCT Pub. No.: WO2021/153987
PCT Pub. Date: Aug. 5, 2021

(65) Prior Publication Data
US 2023/0092951 A1    Mar. 23, 2023

(30) Foreign Application Priority Data
Jan. 30, 2020 (KR) .................. 10-2020-0010814

(51) Int. Cl.
*H01M 4/38* (2006.01)
*H01M 4/04* (2006.01)
*H01M 4/36* (2006.01)
*H01M 4/587* (2010.01)
*H01M 4/60* (2006.01)
*H01M 10/052* (2010.01)
H01M 4/02 (2006.01)
H01M 4/134 (2010.01)

(52) U.S. Cl.
CPC ......... *H01M 4/386* (2013.01); *H01M 4/0404* (2013.01); *H01M 4/366* (2013.01); *H01M 4/587* (2013.01); *H01M 4/602* (2013.01); *H01M 10/052* (2013.01); H01M 2004/021 (2013.01); H01M 2004/027 (2013.01); H01M 4/134 (2013.01); Y02E 60/10 (2013.01)

(58) Field of Classification Search
CPC ......... H01M 10/052; H01M 2004/021; H01M 2004/027; H01M 4/0404; H01M 4/134; H01M 4/366; H01M 4/386; H01M 4/587; H01M 4/602; Y02E 60/10
See application file for complete search history.

(56) References Cited

U.S. PATENT DOCUMENTS

| | | |
|---|---|---|
| 2011/0165464 A1 | 7/2011 | Yew et al. |
| 2011/0165467 A1 | 7/2011 | Yew et al. |
| 2012/0270103 A1 | 10/2012 | Lee et al. |
| 2018/0062175 A1 | 3/2018 | Choi |
| 2018/0254476 A1 | 9/2018 | Fujiwara |
| 2018/0358612 A1 | 12/2018 | Seki et al. |
| 2019/0006679 A1 | 1/2019 | Jeong et al. |
| 2019/0097220 A1* | 3/2019 | Jung ............... H01M 4/622 |
| 2020/0067088 A1 | 2/2020 | Kim et al. |
| 2021/0043935 A1 | 2/2021 | Song et al. |
| 2021/0399290 A1* | 12/2021 | Li ..................... H01M 4/364 |

FOREIGN PATENT DOCUMENTS

| | | |
|---|---|---|
| CN | 107251281 A | 10/2017 |
| CN | 109560262 A | 4/2019 |
| CN | 110622343 A | 12/2019 |
| EP | 3264504 | 1/2018 |
| EP | 3611784 | 2/2020 |
| JP | 5754856 B2 | 7/2015 |
| JP | 6520496 B2 | 5/2019 |
| KR | 10-2011-0080366 A | 7/2011 |
| KR | 10-2012-0119450 A | 10/2012 |
| KR | 10-2014-0120751 A | 10/2014 |
| KR | 10-2017-0074030 A | 6/2017 |
| KR | 10-2017-0107083 A | 9/2017 |
| KR | 10-2018-0025686 A | 3/2018 |
| KR | 10-2018-0088925 A | 8/2018 |
| KR | 10-2018-0121391 A | 11/2018 |
| KR | 20180122962 | 11/2018 |
| KR | 10-2019-0004157 A | 1/2019 |
| KR | 10-2019-0035387 A | 4/2019 |
| KR | 10-2019-0089476 A | 7/2019 |
| WO | 2017/077986 A1 | 5/2017 |

OTHER PUBLICATIONS

International Search Report (with partial translation) and Written Opinion dated May 4, 2021, for corresponding International Patent Application No. PCT/KR2021/001085.

* cited by examiner

*Primary Examiner* — Lingwen R Zeng
(74) *Attorney, Agent, or Firm* — Bryan Cave Leighton Paisner LLP

(57) ABSTRACT

Provided is a negative electrode active material which includes: a silicon-based core; and an outer coating layer formed on the silicon-based core and including polyimide, wherein the polyimide comprises a fluorine-containing imide unit. The outer coating layer may be included in an amount of more than 0 wt % and 4.5 wt % or less in the negative electrode active material.

11 Claims, No Drawings

NEGATIVE ELECTRODE ACTIVE MATERIAL, AND NEGATIVE ELECTRODE AND SECONDARY BATTERY INCLUDING THE SAME

CROSS-REFERENCE TO RELATED APPLICATION

This application claims priority to and the benefit of Korean Patent Application No. 10-2020-0010814, filed on Jan. 30, 2020, the disclosure of which is incorporated herein by reference in its entirety.

TECHNICAL FIELD

The present invention relates to a negative electrode active material, and a negative electrode and a secondary battery including the same.

BACKGROUND ART

Recently, in response to the rapid spread of electronic devices using batteries, such as mobile phones, notebook computers, electric vehicles, and the like, demand for secondary batteries having a small size, a light weight, and relatively high capacity is rapidly increasing. In particular, lithium secondary batteries have been in the spotlight as a driving power source for portable devices due to having a light weight and high energy density. Accordingly, research and development efforts for enhancing the performance of lithium secondary batteries have been continuously made.

In general, lithium secondary batteries include a positive electrode, a negative electrode, a separator interposed between the positive electrode and the negative electrode, an electrolyte, an organic solvent, and the like. In addition, in the positive electrode and the negative electrode, an active material layer including a positive electrode active material or a negative electrode active material may be formed on a current collector. In the positive electrode, a lithium-containing metal oxide such as $LiCoO_2$, $LiMn_2O_4$, or the like is generally used as the positive electrode active material, and in the negative electrode, a carbon-based active material or a silicon-based negative electrode active material, which does not contain lithium, is used as the negative electrode active material.

In particular, the silicon-based negative electrode active material among the negative electrode active materials has attracted attention due to having about 10 times higher capacity than that of the carbon-based negative electrode active materials and has an advantage in that even a thin electrode is used to achieve high energy density due to high capacity. However, the silicon-based negative electrode active material exhibits a large degree of volumetric expansion according to charging and discharging, leading to a great deal of side reactions with an electrolyte. Accordingly, the silicon-based negative electrode active material exhibits poor performance in terms of cycle fading, high-temperature lifetime characteristics, and high-temperature storage characteristics and thus is not commonly used.

Therefore, there is a demand for the development of a secondary battery capable of preventing side reactions with an electrolyte and enhancing lifetime characteristics while achieving the high capacity and energy density of the silicon-based negative electrode active material.

Korean Unexamined Patent Publication No. 10-2017-0074030 relates to a negative electrode active material for a lithium secondary battery, a method of preparing the same, and a lithium secondary battery including the same and discloses a negative electrode active material including a porous silicon-carbon composite, but there is a limitation in solving the above-described problems.

RELATED-ART DOCUMENTS

Patent Documents

Korean Unexamined Patent Publication No. 10-2017-0074030

DETAILED DESCRIPTION OF THE INVENTION

Technical Problem

The present invention is directed to providing a negative electrode active material excellent in high-temperature lifetime performance, high-temperature storage performance, and output performance in use of a silicon-based negative electrode active material.

The present invention is also directed to providing a negative electrode including the above-described negative electrode active material.

The present invention is also directed to providing a secondary battery including the above-described negative electrode.

Technical Solution

One aspect of the present invention provides a negative electrode active material which includes: a silicon-based core; and an outer coating layer formed on the silicon-based core and including polyimide, wherein the polyimide comprises a fluorine-containing imide unit.

Another aspect of the present invention provides a negative electrode which includes: a negative electrode current collector; and a negative electrode active material layer formed on the negative electrode current collector and including a negative electrode material, wherein the negative electrode material includes the above-described negative electrode active material.

Still another aspect of the present invention provides a secondary battery which includes: the above-described negative electrode; a positive electrode disposed to face the negative electrode; a separator interposed between the negative electrode and the positive electrode; and an electrolyte.

Advantageous Effects

A negative electrode active material according to the present invention is characterized by including an outer coating layer which is formed on a silicon-based core and includes polyimide including a fluorine-containing imide unit. Since the polyimide coating layer is formed on a silicon-based core, the volumetric expansion/contraction of the silicon-based core according to charging and discharging can be controlled and simultaneously side reactions with an electrolyte can be prevented at an excellent level, resulting in enhancement of lifetime characteristics. In addition, the outer coating layer including polyimide including a fluorine-containing imide unit can serve as a solid electrolyte interface layer (SEI layer) on the negative electrode active material to prevent side reactions with an electrolyte to a more excellent level and can allow smooth intercalation/deintercalation of lithium into/from the active material due to the high electronegativity of fluorine. Therefore, the resistance of the negative electrode active material can be reduced, and output performance can be enhanced to an excellent level.

Therefore, the high-temperature lifetime performance, high-temperature storage performance, and output performance of a negative electrode and a secondary battery, which use the above-described negative electrode active material, can be enhanced at the same time.

MODES OF THE INVENTION

Terms and words provided herein should not be interpreted as limited to commonly used meanings or meanings in dictionaries and should be interpreted with meanings and concepts which are consistent with the technological scope of the invention based on the principle that the inventors can appropriately define concepts of terms in order to describe the invention in the best way.

The terminology provided herein is merely used for the purpose of describing exemplary embodiments, and is not intended to be limiting of the present invention. The singular forms "a," "an," and "the" are intended to include the plural forms as well, unless the context clearly indicates otherwise.

It should be understood that the terms "comprises," "comprising," "includes," "including," "has," and/or "having," when used herein, specify the presence of stated features, integers, steps, components, and/or combinations thereof, but do not preclude the presence or addition of one or more other features, integers, steps, components, and/or combinations thereof.

In the present invention, an average particle diameter ($D_{50}$) may be defined as a particle diameter corresponding to 50% of the cumulative volume in a particle size distribution and may be measured using a laser diffraction method. Specifically, the average particle diameter ($D_{50}$) may be calculated by dispersing target particles in a dispersion medium, then injecting the resultant into a commercially available laser diffraction particle size analyzer (e.g., Horiba Partica LA-960), and determining an average particle diameter ($D_{50}$) corresponding to 50% of the cumulative volume in a particle size distribution according to a particle diameter measured from scattered light.

Hereinafter, the present invention will be described in detail.

<Negative Electrode Active Material>

The present invention relates to a negative electrode active material, and particularly, to a negative electrode active material for a lithium secondary battery.

The negative electrode active material of the present invention includes: a silicon-based core; and an outer coating layer formed on the silicon-based core and including polyimide, wherein the polyimide comprises a fluorine-containing imide unit.

The negative electrode active material of the present invention is characterized in that polyimide including a fluorine-containing imide unit is included in an outer coating layer on a silicon-based core to prevent the drawbacks of a typical silicon-based negative electrode active material, such as volumetric expansion/contraction according to charging and discharging, side reactions with an electrolyte due to the volumetric expansion/contraction, degradation of high-temperature lifetime performance and high-temperature storage performance, and the like. The outer coating layer may prevent side reactions caused by bringing the silicon-based core, whose volume is expanded/contracted, in contact with an electrolyte, and particularly, the polyimide including a fluorine-containing imide unit may serve as a solid electrolyte interface layer (hereinafter, referred to as "SEI layer") so as to further prevent side reactions with an electrolyte, resulting in enhancement of high-temperature lifetime performance and high-temperature storage performance. In addition, since fluorine contained in the outer coating layer has high electronegativity, it may serve to reduce resistance according to intercalation/deintercalation of lithium ions into/from the silicon-based core, and thus the output performance of the active material may be further enhanced. Therefore, the high-temperature lifetime performance, high-temperature storage performance, and output performance of a negative electrode and a secondary battery, which use the negative electrode active material according to the present invention, may be enhanced at the same time.

The silicon-based core allows lithium to be intercalated/deintercalated and may function as a core particle of the negative electrode active material.

The silicon-based core may include a silicon-based particle comprising a compound represented by the following Chemical Formula 2.

$SiO_x (0 \leq x < 2)$                  [Chemical Formula 2].

When Chemical Formula 2 is $SiO_2$ (in Chemical Formula 2, x=2), $SiO_2$ does not react with lithium ions, and thus the storage of lithium is not possible. Therefore, it is preferable that x is within the above-described range. Specifically, in Chemical Formula 2, x may be $0.5 \leq x \leq 1.5$ in terms of structural stability of the active material.

The silicon-based core may include a metal distributed on a surface of the silicon-based particle, an inside of the silicon-based particle, or on the surface and the inside of the silicon-based particle in addition to the silicon-based particle including a compound represented by Chemical Formula 2. The metal may be distributed in a doped form into the silicon-based particle on/in the surface and/or inside of the silicon-based particle.

The metal distributed on/in the surface and/or inside of the silicon-based particle may serve to control the volumetric expansion/contraction of the silicon-based core at appropriate levels and to prevent the active material from being damaged. Also, the metal may be included so that a proportion of an irreversible phase (e.g., $SiO_2$) in the silicon-based core is lowered to increase the efficiency of the active material.

The metal may be included in an amount of 0.1 wt % to 25 wt %, preferably 1 wt % to 20 wt %, and more preferably 2 wt % to 15 wt %, in the negative electrode active material, and the above-described range is preferred in terms of preventing the silicon-based core from being damaged, achieving more preferable lifetime characteristics, and not impairing the excellent capacity characteristics of the silicon-based core.

The metal may be at least one selected from the group consisting of lithium (Li), magnesium (Mg), aluminum (Al), calcium (Ca), and titanium (Ti), preferably at least one selected from lithium and magnesium. Specifically, the metal may be at least one selected from lithium and magnesium, and more preferably, magnesium, in terms of achieving the above-described effect of preventing the silicon-based core from being damaged and further enhancing initial efficiency.

The silicon-based core may be included in an amount of 50 wt % to 99 wt %, preferably 70 wt % to 97 wt %, and more preferably 85 wt % to 95 wt %, in the negative electrode active material. The above-described range is preferred in terms of enhancing the capacity of a negative electrode.

The outer coating layer is formed on the silicon-based core.

In addition, the outer coating layer includes polyimide, and the polyimide comprises a fluorine-containing imide unit.

The outer coating layer may function as a SEI layer of the negative electrode active material by including polyimide including a fluorine-containing imide unit. Therefore, electrolyte side reactions caused by bringing the silicon-based core and an electrolyte into contact may be prevented at an excellent level to enhance the high-temperature lifetime performance and high-temperature storage performance of the negative electrode active material at excellent levels. Also, the outer coating layer allows lithium ions to be smoothly intercalated/deintercalated into/from the negative electrode active material by including fluorine having high electronegativity, and thus it is preferable in terms of reducing the resistance of the negative electrode active material and enhancing output performance.

The polyimide comprises a fluorine-containing imide unit. The polyimide may prevent side reactions between the silicon-based core and an electrolyte at an excellent level and enhance high-temperature lifetime performance, high-temperature storage performance, and output performance at the same time by including the fluorine-containing imide unit. When the fluorine-containing imide unit is not included in polyimide, the above-described effects of preventing electrolyte side reactions and reducing resistance may not be achieved.

The fluorine-containing imide unit may be included in an amount of preferably 10 wt % or more, more preferably 40 wt % or more, and even more preferably 80 wt % or more, in the polyimide. Within the above-described range, the high-temperature lifetime performance, high-temperature storage performance, and output performance of the negative electrode active material can be enhanced at the same time at excellent levels.

The fluorine-containing imide unit may be represented by the following Chemical Formula 1.

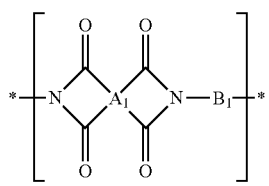

[Chemical Formula 1]

In Chemical Formula 1, $A_1$ is a C4 to C30 tetravalent organic group, $B_1$ is a C6 to C30 divalent organic group, and at least one of $A_1$ and $B_1$ contains fluorine.

When $A_1$ in Chemical Formula 1 contains fluorine, $A_1$ may be one tetravalent organic group selected from the group consisting of the following Chemical Formulas 1-1-A to 1-4-A, and specifically, $A_1$ may be the following Chemical Formula 1-1-A.

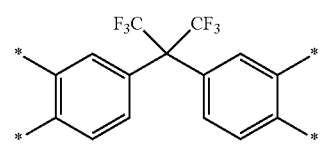

[Chemical Formula 1-1-A]

[Chemical Formula 1-2-A]

[Chemical Formula 1-3-A]

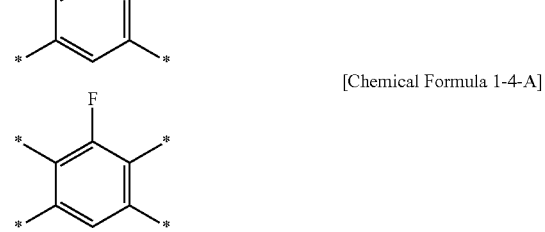

[Chemical Formula 1-4-A]

In Chemical Formulas 1-1-A to 1-4-A, * is a binding site.

When $B_1$ in Chemical Formula 1 contains fluorine, $B_1$ may be one divalent organic group selected from the group consisting of the following Chemical Formulas 1-1-B to 1-6-B, and specifically, $B_1$ may be the following Chemical Formula 1-1-B.

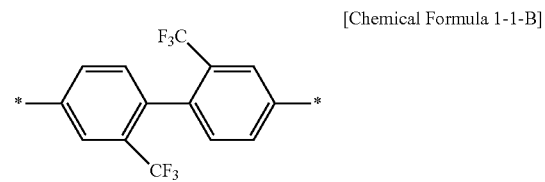

[Chemical Formula 1-1-B]

[Chemical Formula 1-2-B]

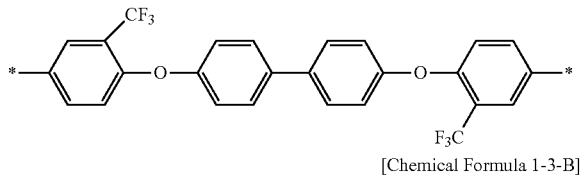

[Chemical Formula 1-3-B]

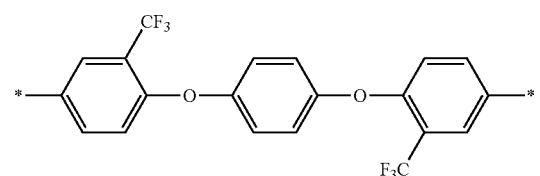

[Chemical Formula 1-4-B]

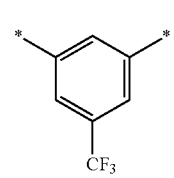

[Chemical Formula 1-5-B]

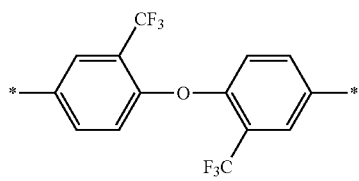

[Chemical Formula 1-6-B]

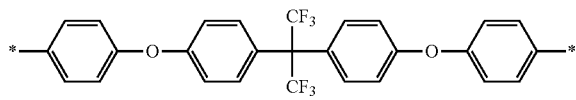

In Chemical Formulas 1-1-B to 1-6-B, * is a binding site.

In Chemical Formula 1, $A_1$ and $B_1$ may contain fluorine, and when both $A_1$ and $B_1$ contain fluorine, the above-described effects of preventing an increase in resistance, enhancing lifetime performance, and enhancing output performance may be achieved at excellent levels.

Specifically, Chemical Formula 1 may be at least one unit selected from the following Chemical Formulas 1-1 and 1-2, and preferably, a unit represented by the following Chemical Formula 1-1.

[Chemical Formula 1-1]

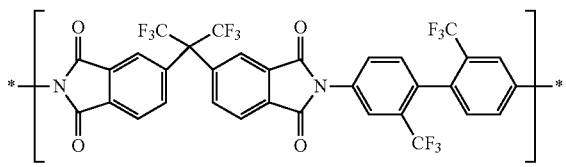

[Chemical Formula 1-2]

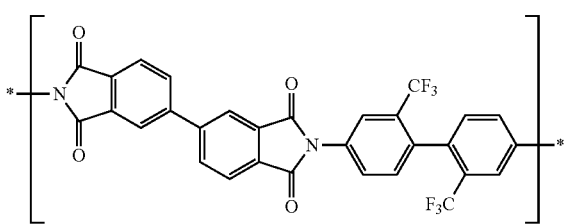

In Chemical Formulas 1-1 and 1-2, * is a binding site.

The polyimide may further include an imide unit not containing fluorine, specifically, a unit represented by the following Chemical Formula 3-1, in addition to the fluorine-containing imide unit, but the present invention is not limited thereto.

[Chemical Formula 3-1]

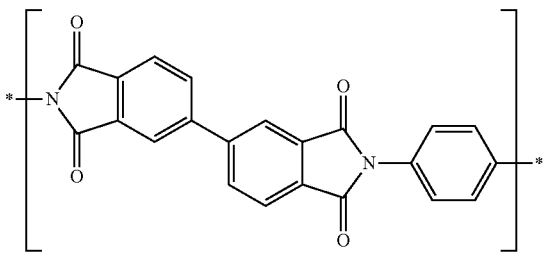

In Chemical Formula 3-1, * is a binding site.

The outer coating layer may contain fluorine in an amount of 10 wt % to 50 wt %, and preferably, 20 wt % to 40 wt %. The above-described range is preferred in terms of enhancing lifetime performance and output characteristics and simultaneously preventing an increase in resistance due to inclusion of an excessive amount of fluorine.

The outer coating layer may be included in an amount of more than 0 wt % and 4.5 wt % or less, preferably 0.1 wt % to 1.5 wt %, and more preferably 0.35 wt % to 0.75 wt %, in the negative electrode active material. When the above-described amount of the outer coating layer is included in a negative electrode active material layer, it is possible to prevent electrolyte side reactions at an excellent level and simultaneously prevent an increase in resistance due to a coating layer formed in an excessive amount, and thus high-temperature lifetime performance, high-temperature storage performance, and output performance can be enhanced at the same time. Also, when the outer coating layer is formed in an excessive amount in the negative electrode active material, excessive aggregation between active material particles may occur, making it difficult to form an electrode. Therefore, it is preferable that the outer coating layer is formed in the above-described range.

The negative electrode active material of the present invention may further include an inner carbon coating layer formed between the silicon-based core and the outer coating layer. The inner carbon coating layer may function as a protective layer that suppresses the volumetric expansion of the silicon-based core and further prevents side reactions with an electrolyte.

The inner carbon coating layer may be included in an amount of 1 wt % to 10 wt %, and preferably, 3 wt % to 7 wt % based on the total weight of the silicon-based core and the inner carbon coating layer. The above-described range is preferred in terms of the inner carbon coating layer controlling the volumetric expansion of the silicon-based core at an excellent level and preventing side reactions with an electrolyte.

The inner carbon coating layer may be an amorphous carbon coating layer. Specifically, the inner carbon coating layer may be formed by chemical vapor deposition (CVD) using at least one hydrocarbon gas selected from the group consisting of methane, ethane, and acetylene.

The negative electrode active material may have an average particle diameter ($D_{50}$) of 0.1 μm to 20 μm, preferably 1 μm to 10 μm, and more preferably 2 μm to 8 μm, in terms of ensuring the structural stability of the active material during charging and discharging, preventing the degree of volumetric expansion/contraction from increasing due to an excessive increase in particle diameter, and preventing initial efficiency from decreasing due to an excessively low particle diameter.

In addition, the present invention provides a method of preparing the above-described negative electrode active material.

The method of preparing the negative electrode active material includes mixing a silicon-based core and a polyimide precursor including a fluorine-containing unit and thermally treating the resulting mixture.

The polyimide precursor is a precursor of polyimide. The polyimide precursor may be cured by the thermal treatment to form an outer coating layer including polyimide on the silicon-based core and includes a fluorine-containing unit.

Specifically, the polyimide precursor may include polyamic acid and/or polyamic acid ester, and more specifically, the polyimide precursor may include a unit represented by the following Chemical Formula 1'.

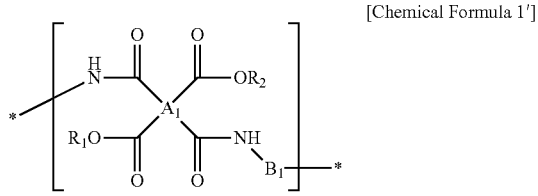

[Chemical Formula 1']

In Chemical Formula 1', $A_1$ and $B_1$ are the same as $A_1$ and $B_1$ described in Chemical Formula 1, $R_1$ and $R_2$ are each independently selected from hydrogen and a C1 to C5 alkyl group.

In Chemical Formula 1', $A_1$ may be one tetravalent organic group selected from the group consisting of Chemical Formulas 1-1-A to 1-4-A as described for Chemical Formula 1.

In Chemical Formula 1', $B_1$ may be one divalent organic group selected from the group consisting of Chemical Formulas 1-1-B to 1-6-B as described for Chemical Formula 1.

The thermal treatment may be performed at 250° C. to 500° C., and preferably, 300° C. to 400° C. so that the polyimide precursor is sufficiently converted into polyimide, and the chemical and physical resistance of polyimide is reinforced. When the thermal treatment is performed in the above-described temperature range, the degree of π-π stacking in polyimide can be increased to realize polyimide having high physical strength and high chemical resistance, and a coating layer having high coverage can be formed, and heat resistance can be enhanced by imidization of polyimide precursor particles while preventing polyimide from being pyrolyzed.

The thermal treatment may be performed for 0.5 hours to 5 hours, and preferably, 1 hour to 3 hours so that a polyimide coating layer having high coverage is formed and prevented from being detached from the surface by dissolving the polyimide coating layer in a solvent or the like due to insufficient imidization.

<Negative Electrode>

The present invention also provides a negative electrode including the above-described negative electrode active material.

Specifically, the negative electrode of the present invention includes: a negative electrode current collector; and a negative electrode active material layer formed on the negative electrode current collector and including a negative electrode material, wherein the negative electrode material includes the above-described negative electrode active material.

The negative electrode current collector is not particularly limited as long as it does not cause a chemical change in the battery and has high conductivity. Specifically, as the negative electrode current collector, copper, stainless steel, aluminum, nickel, titanium, fired carbon, copper or stainless steel whose surface has been treated with carbon, nickel, titanium, silver, or the like, an aluminum-cadmium alloy, or the like may be used.

The negative electrode current collector may typically have a thickness of 3 to 500 μm.

The negative electrode current collector may have fine irregularities formed on the surface thereof to increase the adhesion of a negative electrode active material. Also, the negative electrode current collector may be used in any of various forms such as a film, a sheet, a foil, a net, a porous material, a foam, a non-woven fabric, and the like.

The negative electrode active material layer is formed on the negative electrode current collector.

The negative electrode active material layer includes a negative electrode material, and the negative electrode material includes the above-described negative electrode active material.

The negative electrode active material may be included in the negative electrode to exhibit excellent capacity characteristics and lifetime characteristics.

The negative electrode active material has been described above.

The negative electrode material may further include a carbon-based active material in addition to the above-described negative electrode active material, and the carbon-based active material having the low degree of volumetric expansion according to charging and discharging may reduce the degree of volumetric expansion of the entire negative electrode material.

The carbon-based active material may include at least one selected from the group consisting of graphite, artificial graphite, natural graphite, hard carbon, soft carbon, carbon black, acetylene black, Ketjen black, Super P, graphene, and fibrous carbon and preferably includes at least one selected from the group consisting of artificial graphite and natural graphite.

The carbon-based active material may have an average particle diameter ($D_{50}$) of 1 μm to 50 μm, and preferably, 3 μm to 25 μm in terms of ensuring structural stability and reducing side reactions with an electrolyte during charging and discharging.

Specifically, it is preferable that the negative electrode material includes both the negative electrode active material and the carbon-based active material in terms of improving capacity characteristics and cycle characteristics at the same time. Specifically, it is preferable that the negative electrode material includes the negative electrode active material and the carbon-based active material in a weight ratio of 1:99 to 50:50, and preferably, 2:98 to 30:70.

The negative electrode material may be included in an amount of 80 wt % to 99 wt %, and preferably, 90 wt % to 98.5 wt % in the negative electrode active material layer.

The negative electrode active material layer may include a binder.

The binder may include at least one selected from the group consisting of styrene butadiene rubber (SBR), acrylonitrile butadiene rubber, acrylic rubber, butyl rubber, fluoro rubber, polyvinyl alcohol, carboxymethylcellulose (CMC), starch, hydroxypropylcellulose, regenerated cellulose, polyvinyl alcohol (PVA), polyacrylic acid (PAA), polyethylene glycol (PEG), polyacrylonitrile (PAN), and polyacryl amide (PAM) in terms of enhancing electrode adhesion and imparting sufficient resistance to the volumetric expansion/contraction of the active material. It is preferable that the binder includes SBR in terms of having high strength, having excellent resistance to the volumetric expansion/contraction of the silicon-based negative electrode active material, and imparting excellent flexibility so as to prevent the electrode from being warped, bent, and the like.

The binder may be included in an amount of 0.5 wt % to 10 wt % in the negative electrode active material layer. The above-described range is preferred in terms of more effectively controlling the volumetric expansion of the active material.

The negative electrode active material layer may further include a conductive material. The conductive material may be used to enhance the conductivity of the negative electrode and it is preferable that the conductive material does not cause a chemical change and has conductivity. Specifically, the conductive material may be at least one selected from the group consisting of natural graphite, artificial graphite, carbon black, acetylene black, Ketjen black, channel black, furnace black, lamp black, thermal black, a conductive fiber, carbon nanotubes (CNTs), fluorocarbon; aluminum powder, nickel powder, zinc oxide, potassium titanate, titanium oxide, and a polyphenylene derivative and preferably includes carbon black in terms of realizing high conductivity.

The conductive material may be included in an amount of 0.5 wt % to 10 wt % in the negative electrode active material layer.

The negative electrode active material layer may have a thickness of 10 μm to 100 μm, and preferably, 15 μm to 80 μm in terms of increasing the electrical contact between components of the negative electrode material.

The negative electrode may be produced by dispersing the negative electrode material, the binder, and the conductive material in a solvent for forming a negative electrode slurry to form a negative electrode slurry, applying the negative electrode slurry onto the negative electrode current collector, followed by drying and roll pressing.

The solvent for forming a negative electrode slurry may include at least one selected from the group consisting of distilled water, ethanol, methanol, and isopropyl alcohol, and preferably, distilled water, in terms of easily dispersing components.

<Secondary Battery>

The present invention provides a secondary battery including the above-described negative electrode, and specifically, a lithium secondary battery.

Specifically, the secondary battery according to the present invention includes: the above-described negative electrode; a positive electrode disposed to face the negative electrode; a separator interposed between the negative electrode and the positive electrode; and an electrolyte.

The positive electrode may include a positive electrode current collector; and a positive electrode active material layer formed on the positive electrode current collector.

The positive electrode current collector is not particularly limited as long as it does not cause a chemical change in the battery and has high conductivity. Specifically, as the positive electrode current collector, copper, stainless steel, aluminum, nickel, titanium, fired carbon, copper or stainless steel whose surface has been treated with carbon, nickel, titanium, silver, or the like, an aluminum-cadmium alloy, or the like may be used.

The positive electrode current collector may typically have a thickness of 3 to 500 μm.

The positive electrode current collector may have fine irregularities formed on a surface thereof to increase the adhesion of a positive electrode active material. In addition, the positive electrode current collector may be used in any of various forms such as a film, a sheet, a foil, a net, a porous material, a foam, a non-woven fabric, and the like.

The positive electrode active material layer may include a positive electrode active material.

The positive electrode active material may include a compound that enables the reversible intercalation and deintercalation of lithium, specifically, a lithium-transition metal composite oxide including lithium and at least one transition metal selected from the group consisting of nickel, cobalt, manganese, and aluminum, and preferably, a lithium-transition metal composite oxide including lithium and transition metals including nickel, cobalt, and manganese.

More specifically, the lithium-transition metal composite oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), a lithium-nickel-cobalt-based oxide (e.g., $LiNi_{1-Y1}Co_{Y1}O_2$ (where $0<Y1<1$), etc.), a lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), a lithium-nickel-manganese-cobalt-based oxide (e.g., $Li(Ni_pCo_qMn_{r1})O_2$ (where $0<p<1$, $0<q<1$, $0<r1<1$, $p+q+r1=1$), $Li(Ni_{p1}Co_{q1}Mn_{r2})O_4$ (where $0<p1<2$, $0<q1<2$, $0<r2<2$, $p1+q1+r2=2$), etc.), or a lithium-nickel-cobalt-transition metal (M) oxide (e.g., $Li(Ni_{p2}Co_{q2}Mn_{r3}M_{s2})O_2$ (where M is selected from the group consisting of Al, Fe, V, Cr, Ti, Ta, Mg, and Mo, and p2, q2, r3, and s2 are respective atomic fractions of elements which are independent of one another, and $0<p2<1$, $0<q2<1$, $0<r3<1$, $0<s2<1$, $p2+q2+r3+s2=1$), etc.), which may be used alone or in combination of two or more thereof. Among those listed above, in terms of increasing the capacity characteristics and stability of the battery, the lithium-transition metal composite oxide may be $LiCoO_2$, $LiMnO_2$, $LiNiO_2$, a lithium-nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, etc.), or a lithium-nickel-cobalt-aluminum oxide (e.g., $Li(Ni_{0.8}Co_{0.15}Al_{0.05})O_2$, etc.). In addition, considering that the types and content ratio of elements constituting the lithium-transition metal composite oxide are controlled to realize a remarkable improvement effect, the lithium-transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$, or the like, which may be used alone or in combination of two or more thereof.

The positive electrode active material may be included in an amount of 80 wt % to 99 wt %, and preferably, 92 wt % to 98.5 wt % in the positive electrode active material layer in consideration of sufficiently exhibiting the capacity of the positive electrode active material.

The positive electrode active material layer may further include a binder and/or a conductive material in addition to the above-described positive electrode active material.

The binder serves to assist bonding between an active material and a conductive material and bonding to a current collector. Specifically, the binder may include at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer (EPDM), a sulfonated EPDM, styrene butadiene rubber, and fluorine rubber and preferably includes polyvinylidene fluoride.

The binder may be included in an amount of 1 wt % to 20 wt %, and preferably, 1.2 wt % to 10 wt % in the positive electrode active material layer in terms of sufficiently ensuring bonding between components such as the positive electrode active material and the like.

The conductive material may be used to impart conductivity to a secondary battery and improve the conductivity and is not particularly limited as long as it does not cause a chemical change and has conductivity. Specifically, the conductive material may include at least one selected from the group consisting of graphite such as natural graphite, artificial graphite, or the like; a carbon-based material such as carbon black, acetylene black, Ketjen black, channel black, furnace black, lamp black, thermal black, or the like; a conductive fiber such as carbon fibers, metal fibers, or the like; a conductive tube such as carbon nanotubes or the like; fluorocarbon; a metal powder such as aluminum powder, nickel powder, or the like; a conductive whisker consisting of zinc oxide, potassium titanate, or the like; a conductive metal oxide such as titanium oxide or the like; and a polyphenylene derivative and preferably includes carbon black in terms of enhancing conductivity.

The conductive material may be included in an amount of 1 wt % to 20 wt %, and preferably, 1.2 wt % to 10 wt % in the positive electrode active material layer in terms of sufficiently ensuring electrical conductivity.

The positive electrode active material layer may have a thickness of 30 μm to 400 μm, and preferably, 50 μm to 110 μm.

The positive electrode may be produced by applying a positive electrode slurry including the positive electrode active material, and optionally, the binder, the conductive material, and a solvent for forming a positive electrode slurry onto the positive electrode current collector, followed by drying and roll pressing.

The solvent for forming a positive electrode slurry may include an organic solvent such as N-methyl-2-pyrrolidone (NMP) or the like and may be used in an amount suitable for achieving preferable viscosity when the positive electrode active material, and optionally, the binder and the conductive material are included. For example, the solvent for forming a positive electrode slurry may be included in the positive electrode slurry so that the amount of a solid content including the positive electrode active material, and optionally, the binder and the conductive material ranges from 50 wt % to 95 wt %, and preferably, 70 wt % to 90 wt %.

The separator serves to separate the negative electrode and the positive electrode and provide a passage for lithium ion migration, and any separator used as a separator in a typical lithium secondary battery may be used without limitation. In particular, a separator that exhibits low resistance to the migration of ions of an electrolyte and has an excellent electrolyte impregnation ability is preferred. Specifically, as the separator, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof may be used. In addition, as the separator, a common porous non-woven fabric, for example, a non-woven fabric made of high-melting-point glass fiber, polyethylene terephthalate fiber, or the like may be used. Additionally, in order to ensure heat resistance or mechanical strength, a coated separator which includes a ceramic component or polymer material and optionally has a single-layer or multi-layer structure may be used as the separator.

Examples of the electrolyte used in the present invention include an organic liquid electrolyte, an inorganic liquid electrolyte, a solid polymer electrolyte, a gel-type polymer electrolyte, an inorganic solid electrolyte, a molten-type inorganic electrolyte, and the like that are usable in the production of a secondary battery, but the present invention is not limited thereto.

Specifically, the electrolyte may include an organic solvent and a lithium salt.

As the organic solvent, any organic solvent may be used without particular limitation as long as it may serve as a medium through which ions involved in an electrochemical reaction of the battery can migrate. Specifically, the organic solvent may be: an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane. Among those listed above, the carbonate-based solvent is preferred, and a mixture of a cyclic carbonate-based compound with high ion conductivity and high permittivity (e.g., EC, PC, etc.) and a linear carbonate-based compound with low viscosity (e.g., EMC, DMC, DEC, etc.), which may increase the charging/discharging performance of the battery, is more preferred. In this case, when a mixture obtained by mixing the cyclic carbonate-based compound and the linear carbonate-based compound in a volume ratio of about 1:1 to about 1:9 is used, excellent electrolyte performance may be exhibited.

As the lithium salt, any compound may be used without particular limitation as long as it may provide lithium ions used in the lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, or the like may be used. The lithium salt is preferably used at a concentration of 0.1 to 2.0 M. When the concentration of the lithium salt is within the above-described range, the electrolyte has appropriate levels of conductivity and viscosity, and thus excellent electrolyte performance can be exhibited, and lithium ions can effectively migrate.

The secondary battery may be produced by a conventional method of producing a secondary battery, that is, by interposing a separator between the above-described negative electrode and positive electrode and injecting an electrolyte solution.

The secondary battery according to the present invention is useful in the field of portable devices such as mobile phones, notebook computers, digital cameras, and the like and electric vehicles such as hybrid electric vehicles (HEVs) and the like and is preferably used, particularly, as a battery constituting a medium-to-large-sized battery module. Therefore, the present invention also provides a medium-to-large-sized battery module including the above-described secondary battery as a unit cell.

Such a medium-to-large-sized battery module is preferably applied as a power source that requires high output and high capacity, such as electric vehicles, hybrid electric vehicles, a system for storing electric power, and the like.

Hereinafter, the present invention will be described in detail with reference to embodiments so that those skilled in the art can easily carry out the present invention. However, the present invention may be embodied in several different forms, and therefore, is not limited to embodiments described herein.

EXAMPLES

Example 1

<Silicon-Based Core>

As silicon-based particles, SiO was prepared (average particle diameter ($D_{50}$): 5 μm).

The silicon-based oxide particles and Mg metal as a metal-containing material were mixed in a weight ratio of 92:8, and the resulting mixture was thermally treated at 1,050° C. for 2 hours to prepare a silicon-based core including Mg distributed on/in the surface and/or inside thereof.

Chemical vapor deposition (CVD) was performed at 950° C. by allowing methane as hydrocarbon gas to flow on the silicon-based core to form an inner carbon coating layer on the silicon-based core.

The inner carbon coating layer was formed in an amount of 5 wt % with respect to the total weight of the silicon-based core and the inner carbon coating layer.

<Formation of Outer Coating Layer>

13 g of 2,2'-bis(trifluoromethyl)benzidine was dissolved in 77 g of a N-methyl-2-pyrrolidone (NMP) solvent, and 20 g of 4,4'-(hexafluoroisopropylidene)diphthalic anhydride was added to the resulting solution. Then, a temperature was raised to 40° C., and stirring was performed for 16 hours to prepare a polyimide precursor-containing solution having a solid content of 30 wt %. Subsequently, the polyimide precursor-containing solution was diluted so that a solid content became 0.5 wt %.

Afterward, the silicon-based core having the inner carbon coating layer formed thereon and the polyimide precursor-containing solution were mixed in a weight ratio of 50:50, and the resulting mixture was thermally treated at 350° C. for 1 hour to form an outer coating layer including polyimide on the silicon-based core having the inner carbon coating layer formed thereon, and the resulting product was used as a negative electrode active material of Example 1 (average particle diameter ($D_{50}$): 6 μm).

In the negative electrode active material of Example 1, the polyimide included a unit represented by the following Chemical Formula 1-1.

[Chemical Formula 1-1]

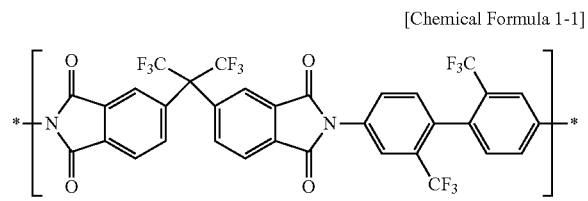

In the negative electrode active material of Example 1, a weight ratio of the silicon-based core having the inner carbon coating layer formed thereon and the outer coating layer was 99.5:0.5. Also, the outer coating layer contained fluorine in an amount of about 33 wt %.

A weight of the outer coating layer was measured by calculating a difference between the weight of the silicon-based core having the inner carbon coating layer formed thereon before polyimide coating and the weight of the negative electrode active material after polyimide coating through thermogravimetric analysis (TGA).

Example 2

<Silicon-Based Core>

The silicon-based core having the inner carbon coating layer formed thereon, which was prepared in Example 1, was used.

<Formation of Outer Coating Layer>

A negative electrode active material of Example 2 was prepared by forming an outer coating layer on the silicon-based core having the inner carbon coating layer formed thereon in the same manner as in Example 1, except that 3,3',4,4'-biphenyl tetracarboxylic acid dianhydride (BPDA) was used instead of 4,4'-(hexafluoroisopropylidene)diphthalic anhydride.

In the negative electrode active material of Example 2, the polyimide included a unit represented by the following Chemical Formula 1-2.

[Chemical Formula 1-2]

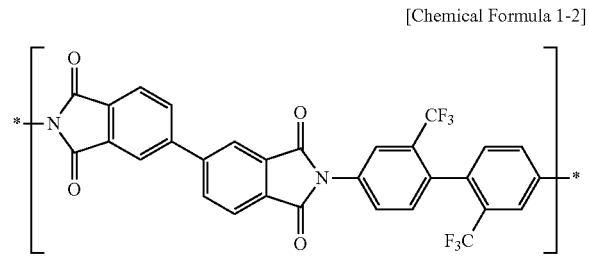

In the negative electrode active material of Example 2, a weight ratio of the silicon-based core having the inner carbon coating layer formed thereon and the outer coating layer was 99.5:0.5. Also, the outer coating layer contained fluorine in an amount of about 16 wt %.

Example 3

<Silicon-Based Core>

The silicon-based core having the inner carbon coating layer formed thereon, which was prepared in Example 1, was used.

<Formation of Outer Coating Layer>

13 g of p-phenylene diamine (PDA) was dissolved in 77 g of a N-methylpyrrolidone (NMP) solvent, and 20 g of 3,3',4,4'-biphenyl tetracarboxylic acid dianhydride (BPDA) was added to the resulting solution. Then, a temperature was raised to 40° C., and stirring was performed for 16 hours to prepare a second polyimide precursor-containing solution having a solid content of 30 wt %.

The polyimide precursor-containing solution having a solid content of 30 wt %, which was prepared in Example 1, was provided as a first polyimide precursor-containing solution, and the first polyimide precursor-containing solution and the second polyimide precursor-containing solution were mixed in a weight ratio of 50:50, then prepared a polyimide precursor-containing solution having a solid content of 0.5 wt %.

A negative electrode active material of Example 3 was prepared in the same manner as in Example 1, except that the prepared polyimide precursor-containing solution was used.

In the negative electrode active material of Example 3, the polyimide included a unit represented by the following Chemical Formula 1-1 and a unit represented by the following Chemical Formula 3-1. The unit represented by Chemical Formula 1-1 is derived from a first polyimide precursor in the first polyimide precursor-containing solution, and the unit represented by Chemical Formula 3-1 is derived from a second polyimide precursor in the second polyimide precursor-containing solution.

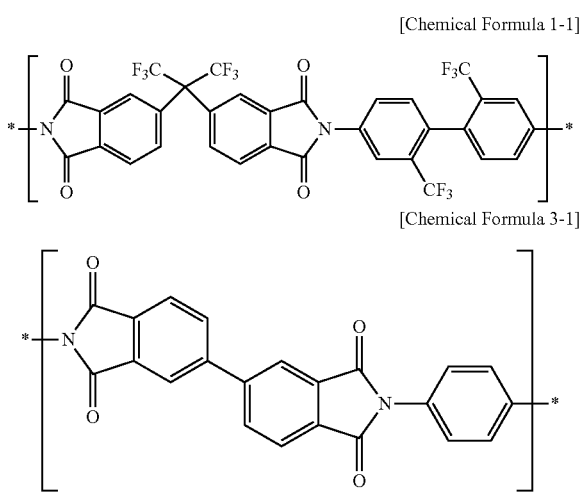

[Chemical Formula 1-1]

[Chemical Formula 3-1]

In the negative electrode active material of Example 3, a weight ratio of the silicon-based core having the inner carbon coating layer formed thereon and the outer coating layer was 99.5:0.5. Also, the outer coating layer contained fluorine in an amount of about 16 wt %.

Example 4

<Silicon-Based Core>

The silicon-based core having the inner carbon coating layer formed thereon, which was prepared in Example 1, was used.

<Formation of Outer Coating Layer>

A negative electrode active material of Example 4 was prepared in the same manner as in Example 1, except that the polyimide precursor-containing solution having a solid content of 30 wt %, which was prepared in Example 1, was diluted so that a solid content became 0.25 wt % instead of 0.5 wt %.

In the negative electrode active material of Example 4, a weight ratio of the silicon-based core having the inner carbon coating layer formed thereon and the outer coating layer was 99.75:0.25. Also, the outer coating layer contained fluorine in an amount of about 33 wt %.

Example 5

<Silicon-Based Core>

The silicon-based core having the inner carbon coating layer formed thereon, which was prepared in Example 1, was used.

<Formation of Outer Coating Layer>

A negative electrode active material of Example 5 was prepared in the same manner as in Example 1, except that the polyimide precursor-containing solution having a solid content of 30 wt %, which was prepared in Example 1, was diluted so that a solid content became 1 wt % instead of 0.5 wt %.

In the negative electrode active material of Example 5, a weight ratio of the silicon-based core having the inner carbon coating layer formed thereon and the outer coating layer was 99:1. Also, the outer coating layer contained fluorine in an amount of about 33 wt %.

Comparative Example 1

The silicon-based core having the inner carbon coating layer formed thereon, which was prepared in Example 1, was provided as a negative electrode active material of Comparative Example 1. In the negative electrode active material of Comparative Example 1, an outer coating layer was not formed.

Comparative Example 2

<Silicon-Based Core>

The silicon-based core having the inner carbon coating layer formed thereon, which was prepared in Example 1, was used.

<Formation of Polyimide Coating Layer>

13 g of p-phenylene diamine (PDA) was dissolved in 77 g of a N-methylpyrrolidone (NMP) solvent, and 20 g of 3,3',4,4'-biphenyl tetracarboxylic acid dianhydride (BPDA) was added to the resulting solution. Then, a temperature was raised to 40° C., and stirring was performed for 16 hours to prepare a polyimide precursor-containing solution having a solid content of 30 wt %. Subsequently, the polyimide precursor-containing solution was diluted so that a solid content became 0.5 wt %.

A negative electrode active material of Comparative Example 2 was prepared in the same manner as in Example 1, except that the prepared polyimide precursor-containing solution was used.

In the negative electrode active material of Comparative Example 2, a weight ratio of the silicon-based core having the inner carbon coating layer formed thereon and the outer coating layer was 99.5:0.5. The outer coating layer did not contain fluorine.

TABLE 1

|  | Amount of outer coating layer (based on negative electrode active material, wt %) | Amount of fluorine (based on outer coating layer, wt %) |
| --- | --- | --- |
| Example 1 | 0.5 | about 33 |
| Example 2 | 0.5 | about 16 |
| Example 3 | 0.5 | about 16 |
| Example 4 | 0.25 | about 33 |
| Example 5 | 1 | about 33 |
| Comparative Example 1 | 0 | — |
| Comparative Example 2 | 0.5 | 0 |

Experimental Examples

<Production of Negative Electrode>

As a negative electrode material, a mixture obtained by mixing the negative electrode active material prepared in Example 1 and natural graphite (average particle diameter ($D_{50}$): 15 μm) as a carbon-based active material in a weight ratio of 5:95 was used.

The negative electrode material, styrene butadiene rubber (SBR) as a binder, Super C65 as a conductive material, and carboxymethylcellulose (CMC) as a thickener were mixed in a weight ratio of 96:2:1:1, and the resulting mixture was added to distilled water as a solvent for forming a negative electrode slurry to prepare a negative electrode slurry.

The negative electrode slurry was applied in a loading amount of 3 mAh/cm² onto one surface of a copper current collector (thickness: 15 μm) as a negative electrode current collector, followed by roll pressing and drying in a 130° C. vacuum oven for 10 hours to form a negative electrode active material layer (thickness: 60 μm). The resulting product was used as a negative electrode according to Example 1 (thickness of negative electrode: 75 μm).

In addition, negative electrodes according to Examples 2 to 5 and Comparative Examples 1 and 2 were produced in the same manner as above, except that each of the composite negative electrode active materials of Examples 2 to 5 and Comparative Examples 1 and 2 was used instead of the composite negative electrode active material of Example 1.

<Production of Secondary Battery>

$LiNi_{0.6}Co_{0.2}Mn_{0.2}O_2$ as a positive electrode active material, Super C65 as a conductive material, and polyvinylidene fluoride (PVdF) as a binder were added in a weight ratio of 96:2:2 to N-methylpyrrolidone (NMP) to prepare a positive electrode slurry. The positive electrode slurry was applied onto an aluminum current collector, followed by roll pressing and drying to produce a positive electrode.

A porous polyethylene separator was interposed between each of the negative electrodes according to Examples 1 to 5 and Comparative Examples 1 and 2 and the positive electrode, and an electrolyte was injected to produce a pouch-type secondary battery.

As the electrolyte, an electrolyte obtained by dissolving vinylene carbonate (VC) at 1.5 wt % in a solution obtained by mixing ethyl methyl carbonate (EMC) and ethylene carbonate (EC) in a volume ratio of 7:3 and dissolving $LiPF_6$ at a concentration of 1 M therein was used.

Experimental Example 1: Evaluation of High-Temperature Lifetime Performance

The cycle capacity retention rate of the secondary batteries produced according to Examples 1 to 5 and Comparative Examples 1 and 2 was evaluated using an electrochemical charger/discharger.

For evaluation of a cycle capacity retention rate, charging and discharging were performed at 0.1 C during the $1^{st}$ to $3^{rd}$ cycles and at 1.0 C from the $4^{th}$ cycle (charging conditions: CC/CV, 4.25V/0.05 C cut-off, discharging conditions: CC, 2.5V cut off). The charging and discharging were performed at 45° C.

A capacity retention rate was calculated as follows.

Capacity retention rate (%)={(Discharge capacity at the $N^{th}$ cycle)/(Discharge capacity at the $4^{th}$ cycle)}×100

(In the equation, N is an integer of 4 or more.)

A 300-cycle capacity retention rate (%) is shown in the following Table 2.

TABLE 2

| | 300-cycle capacity retention rate (%) |
|---|---|
| Example 1 | 87 |
| Example 2 | 85 |
| Example 3 | 85 |
| Example 4 | 84 |
| Example 5 | 84 |
| Comparative Example 1 | 80 |
| Comparative Example 2 | 81 |

Referring to Table 2, it can be seen that the secondary batteries of Examples exhibited an excellent level of high-temperature lifetime characteristic, as compared to the secondary batteries of Comparative Examples, by using a negative electrode active material in which a polyimide coating layer containing a preferable amount of fluorine was formed on a silicon-based core.

Experimental Example 2: Evaluation of High-Temperature Storage Performance

The high-temperature storage performance of the secondary batteries produced according to Examples 1 to 5 and Comparative Examples 1 and 2 was evaluated.

Specifically, a capacity retention rate after the secondary batteries were stored at a high temperature of 60° C. for 8 weeks was measured, and results thereof are shown in Table 3 below.

For evaluation of a capacity retention rate, charging and discharging were performed at 0.3 C during the $1^{st}$ to $3^{rd}$ cycles and at 1.0 C from the $4^{th}$ cycle (charging conditions: CC/CV, 4.25 V/0.05 C cut-off, discharging conditions: CC, 2.5V cut off). The charging and discharging were performed at 25° C.

A capacity retention rate was calculated as follows, and results thereof are shown in Table 3 below.

Capacity retention rate (%)={(Discharge capacity at the 3rd cycle after 8-week high-temperature storage)/(Initial discharge capacity)}×100

TABLE 3

| | Capacity retention rate (%) |
|---|---|
| Example 1 | 86 |
| Example 2 | 84 |
| Example 3 | 84 |
| Example 4 | 83 |
| Example 5 | 84 |
| Comparative Example 1 | 77 |
| Comparative Example 2 | 80 |

Referring to Table 3, it can be seen that the secondary batteries of Examples exhibited an excellent level of high-temperature storage characteristic, as compared to the secondary batteries of Comparative Examples, by using a negative electrode active material in which a polyimide coating layer containing a preferable amount of fluorine was formed on a silicon-based core.

Experimental Example 3: Evaluation of Resistance Performance

The secondary batteries of Examples and Comparative Examples were subjected to the first charging by charging the batteries at 25° C. at a constant current (CC) of 0.3 C up to 4.25 V and then at a constant voltage (CV) until a charging current became 0.05 C (cut-off current). Then, the batteries were allowed to stand for 20 minutes and then discharged at a constant current (CC) of 0.3 C up to 2.5 V, and discharge capacity was measured.

In addition, the secondary batteries were fully charged again in the same manner and allowed to stand for 1 hour, and initial resistance was measured by dividing a variation in voltage up to 10 seconds of initial discharge at a current of 3.0 C by the current.

Measurement results of the discharge capacity and initial resistance are shown in the following Table 4.

TABLE 4

|  | Discharge capacity (mAh/g) | Initial resistance (mΩ) |
|---|---|---|
| Example 1 | 80 | 825 |
| Example 2 | 80 | 840 |
| Example 3 | 80 | 851 |
| Example 4 | 80 | 834 |
| Example 5 | 80 | 847 |
| Comparative Example 1 | 80 | 860 |
| Comparative Example 2 | 80 | 884 |

Referring to Table 4, it can be seen that the secondary batteries of Examples exhibited an excellent level of resistance reduction effect, as compared to the secondary batteries of Comparative Examples, by using a negative electrode active material in which a polyimide coating layer containing a preferable amount of fluorine was formed on a silicon-based core.

The invention claimed is:

1. A negative electrode active material comprising:
   a silicon-based core; and
   an outer coating layer disposed on the silicon-based core and essentially consisting of polyimide,
   wherein the polyimide comprises a fluorine-containing imide unit.

2. The negative electrode active material of claim 1, wherein the outer coating layer is included in an amount of more than 0 wt % and 4.5 wt % or less in the negative electrode active material.

3. The negative electrode active material of claim 1, wherein the outer coating layer contains fluorine in an amount of from 10 wt % to 50 wt %.

4. The negative electrode active material of claim 1, wherein the fluorine-containing imide unit is represented by the following Chemical Formula 1:

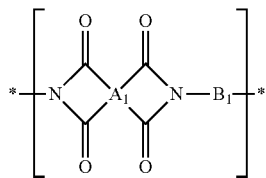

[Chemical Formula 1]

in the Chemical Formula 1, $A_1$ is a C4 to C30 tetravalent organic group, $B_1$ is a C6 to C30 divalent organic group, and at least one of $A_1$ and $B_1$ contains fluorine.

5. The negative electrode active material of claim 1, further comprising an inner carbon coating layer disposed between the silicon-based core and the outer coating layer.

6. The negative electrode active material of claim 5, wherein the inner carbon coating layer is included in an amount of from 1 wt % to 10 wt % based on a total weight of the silicon-based core and the inner carbon coating layer.

7. The negative electrode active material of claim 1, wherein the silicon-based core includes a silicon-based particle comprising a compound represented by Chemical Formula 2 below and a metal distributed on a surface of the silicon-based particle, an inside of the silicon-based particle, or on the surface and the inside of the silicon-based particle, and the metal is at least one selected from the group consisting of Li, Mg, Al, Ca and Ti:

$$SiO_x (0 \leq x < 2).$$ [Chemical Formula 2]

8. The negative electrode active material of claim 7, wherein the metal is included in an amount of from 0.1 wt % to 25 wt % in the silicon-based core.

9. The negative electrode active material of claim 1, wherein the negative electrode active material has an average particle diameter ($D_{50}$) of from 0.1 μm to 20 μm.

10. A negative electrode comprising:
    a negative electrode current collector; and
    a negative electrode active material layer disposed on the negative electrode current collector and including a negative electrode material,
    wherein the negative electrode material includes the negative electrode active material according to claim 1.

11. A secondary battery comprising:
    the negative electrode according to claim 10;
    a positive electrode disposed to face the negative electrode;
    a separator interposed between the negative electrode and the positive electrode; and
    an electrolyte.

* * * * *